United States Patent
Anzai et al.

[11] Patent Number: 5,500,307
[45] Date of Patent: Mar. 19, 1996

[54] SOLID OXIDE FUEL CELL

[75] Inventors: Iwao Anzai; Shigeki Matsuoka; Jun Uehara, all of Yokohama, Japan

[73] Assignees: Nippon Oil Company; Petroleum Energy Center Foundation, both of Tokyo, Japan

[21] Appl. No.: 489,929

[22] Filed: Jun. 12, 1995

Related U.S. Application Data

[63] Continuation of Ser. No. 94,878, Jul. 22, 1993, abandoned.

[30] Foreign Application Priority Data

Jul. 27, 1992 [JP] Japan ..................... 4-219728

[51] Int. Cl.$^6$ ..................... H01M 4/90
[52] U.S. Cl. ..................... 429/30; 429/40; 429/44
[58] Field of Search ............... 429/30, 33, 40, 429/44

[56] References Cited

U.S. PATENT DOCUMENTS

| | | | |
|---|---|---|---|
| 3,291,753 | 12/1966 | Thompson | 429/40 X |
| 3,433,680 | 3/1969 | Archer et al. | 429/40 |
| 4,460,660 | 7/1984 | Kujas | 429/40 |
| 4,767,518 | 8/1988 | Maskaciok | 429/33 X |
| 5,021,304 | 6/1991 | Ruka et al. | 429/30 |

FOREIGN PATENT DOCUMENTS

| | | |
|---|---|---|
| 0441329 | 8/1991 | European Pat. Off. . |
| 0526749 | 2/1993 | European Pat. Off. . |
| 57-130381 | 8/1982 | Japan . |
| 1-279576 | 11/1989 | Japan . |
| 2-129861 | 5/1990 | Japan . |

OTHER PUBLICATIONS

Chem. Abstracts, vol. 117, No. 16, 19 Oct. 1992, Columbus, Ohio, U.S.; abstract No. 154597w, Yamada et al 'Internal-–reforming fuel cells' (abstract) & JP-A-04-160-760 (Yuasa Battery Co.) 4 Jun. 1992.
Journal of the Electrochemical Society, vol. 139, No. 1, Jan. 1992, Manchester, New Hampshire US, pp. L12-L13; Hirokazu Sasaki et al 'High-Power-Density-Solid-Oxide-–Electrolyte Fuel Cells' (abstract).
Comm. Eur. Communites, (REP) EUR 13564 1991, pp. 585–591—Minori Suziki et al 'Development of Ru/ZrO2 SOFC Anode', p. 586, paragraph 2 (month N/A).
European Search Report dated Nov. 17, 1993.

*Primary Examiner*—Stephen Kalafut
*Attorney, Agent, or Firm*—Armstrong, Westerman, Hattori, McLeland & Naughton

[57] ABSTRACT

A solid oxide fuel cell, which comprises an assembly of a plurality of unit cells each comprising a solid electrolyte, and a fuel electrode and an air electrode provided on both sides of the solid electrolyte, respectively, the fuel electrode being composed mainly of ruthenium, nickel and ceramics can perform power generation of high efficiency with hydrocarbon or hydrogen resulting from complete reforming of hydrocarbon, or a steam-reformed gas containing carbon monoxide as the main component as a fuel gas.

6 Claims, 1 Drawing Sheet

SOLID OXIDE FUEL CELL

This application is a continuation of application Ser. No. 08/094,878 filed Jul. 22, 1993, now abandoned.

BACKGROUND OF THE INVENTION

1. Field of the Invention

The present invention relates to a solid oxide fuel cell, and more particularly to a solid oxide fuel cell capable of performing power generation of high efficiency, using hydrocarbon or a steam reformed gas containing hydrogen and carbon monoxide as main components, obtained by complete reforming of hydrocarbon as fuel.

2. Prior Art

Generally, a solid oxide fuel cell is an assembly consisting of a plurality of unit cell structures each comprising a solid electrolyte provided between electrode plates, i.e. a positive pole, which will be hereinafter referred to as an air electrode, and a negative pole, which will be hereinafter referred to as a fuel electrode, where a hydrogen gas, which will be hereinafter referred to merely as hydrogen, is supplied to the fuel electrode of the fuel cell as fuel and air (oxygen) is supplied to the air electrode as an oxidizing agent and the hydrogen reacts with the oxygen through the electrolyte, thereby generating an electromotive force (electric energy).

The solid oxide fuel cell has a high power generation with low pollution and highly expected practical applications in various domestic and industrial fields. Heretofore, researches and developments have been made on constituent materials of solid oxide fuel cells directed to hydrogen as fuel, and thus sintered nickel zirconia cermet has been widely used, for example, for the fuel electrode.

For practical application of solid oxide fuel cells, however, it is necessary to conduct power generation of high efficiency with fuel obtained by steam reforming of hydrocarbon as a raw material. Thus, it is necessary to conduct efficient power generation even with carbon monoxide in the reformed gas together with hydrogen. Still furthermore, it is preferable to directly conduct steam reforming on the fuel electrode on the basis of the cell working temperature, thereby making the reformer as small as possible and carrying out power generation of high efficiency even with partially steam-reformed raw material, or to conduct steam reforming only by the fuel electrode without using any reformer at all, thereby carrying out power generation of high efficiency. Thus, it is required that the fuel electrode has a good electrode activity to not only hydrogen, but also carbon monoxide and a good steam reforming activity to hydrocarbon. However, the conventional sintered porous nickel zirconia cermet has no satisfactory electrode activity to carbon monoxide and consequently has a low steam reforming activity to hydrocarbon as problems.

SUMMARY OF THE INVENTION

An object of the present invention is to provide a solid oxide fuel cell having a high steam reforming activity and a high electrode activity to both hydrogen and carbon monoxide, that is a low electrode overvoltage with both hydrogen and carbon monoxide as fuels, thereby carrying out power generation of high efficiency by directly reforming raw material hydrocarbon by the fuel electrode without using any reformer at all or with partially reformed raw material as fuel by a reformer of smaller size.

The present inventors have found, as a result of extensive studies mainly on improvement of steam reforming activity of fuel electrode to hydrocarbon and reduction in electrode overvoltage with hydrogen and carbon monoxide, that the object of the present invention can be attained with a specific fuel electrode. That is, according to the present invention, there is provided a solid oxide fuel cell, which comprises an assembly of a plurality of unit cells, each comprising a solid electrolyte, and a fuel electrode and an air electrode, provided on both sides of the solid electrolyte, respectively, the fuel electrode being composed mainly of ruthenium, nickel and ceramics.

DETAILED DESCRIPTION OF THE INVENTION

Figure 1:
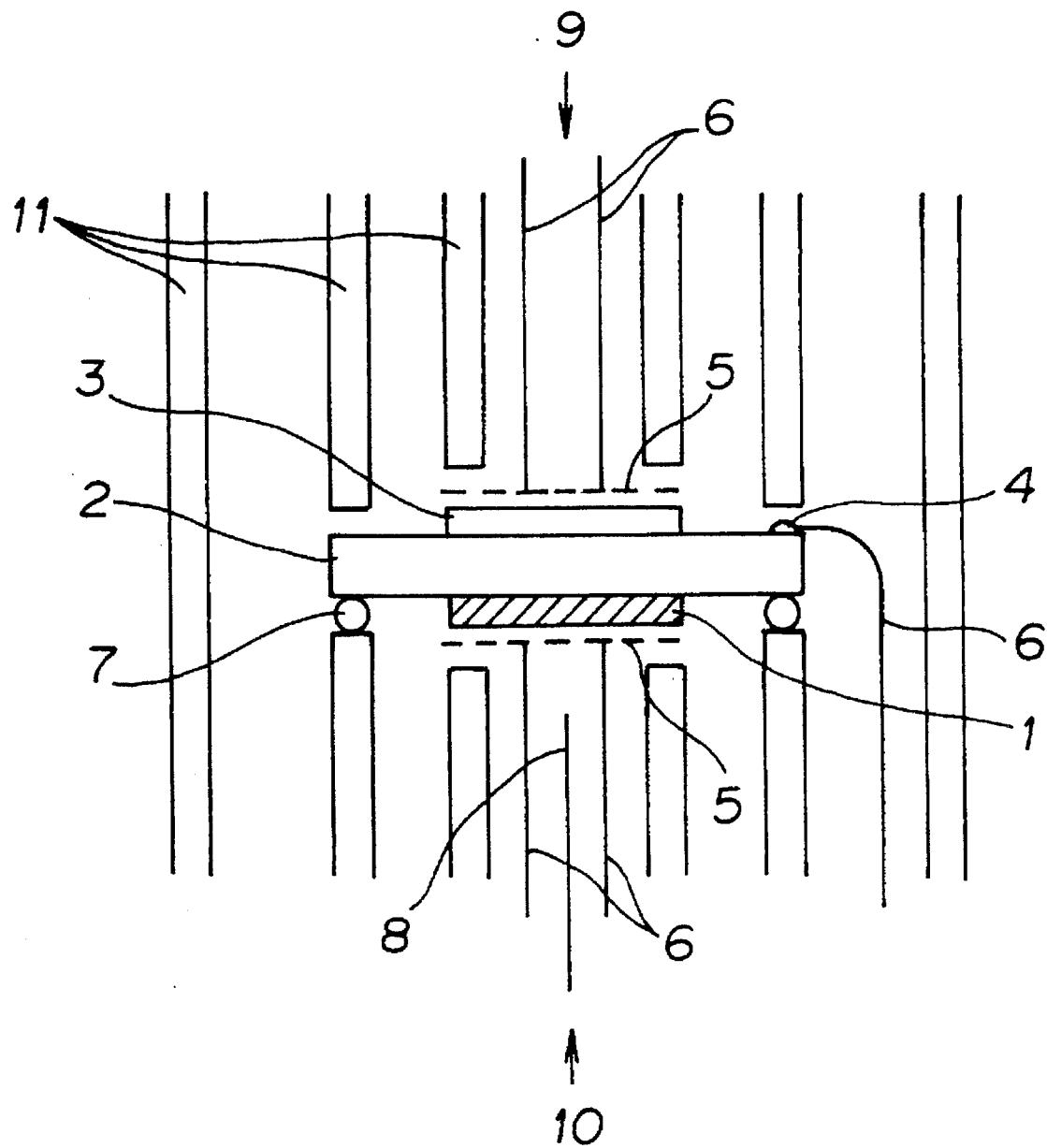
FIG. 1 is a schematic view of an evaluation apparatus used in Examples and Comparative Examples.

The structure of the present invention will be described in detail below:

In the present solid oxide fuel cell, it is essential that the fuel cell is composed mainly of ruthenium, nickel and ceramics.

It is known that ruthenium has a higher steam reforming activity than nickel. Single use of ruthenium as a fuel electrode requires a large amount of expensive ruthenium in order to prevent the electrode from a decrease in the electron conductivity, and this makes the electrode economically disadvantageous. On the other hand, nickel has a high electron transfer function and also has a high electrode activity to hydrogen fuel. Thus, the amount of ruthenium to be used can be decreased by making the ruthenium take the steam reforming function to hydrocarbon and the nickel take the electron transfer function. Furthermore, the combination of nickel with ruthenium can improve the electrode activity to carbon monoxide without lowering the electrode activity of nickel to hydrogen. Still furthermore, a combination thereof with ceramics composed mainly of cerium oxide can improve the steam reforming activity of ruthenium and the electrode activity of nickel.

The fuel electrode of the present invention comprises not more than 30% by weight of ruthenium, 20 to 60% by weight of nickel and 10 to 70% of ceramics, more preferably 5 to 10% by weight of ruthenium, 30 to 50% by weight of nickel and 40 to 65% by weight of ceramics. In these ranges, the present fuel electrode has a high steam reforming activity and a high electrode activity to both hydrogen and carbon monoxide as fuels. Above 30% by weight of ruthenium there appear such disadvantages as a decrease in the electrode activity and an increase in electric resistance due to the consequent reduction in the nickel content. Below 20% by weight of nickel, there appear a decrease in the electrode activity and an increase in the electric resistance. Above 60% by weight of nickel, on the other hand, there appears a disadvantage as a decrease in the electrode activity due to the sintering of nickel at a cell working temperature of 1,000° C. Below 10% by weight of ceramics, there appears a decrease in the steam reforming activity and electrode activity due to sintering of ruthernium and nickel at a cell working temperature of 1,000° C. Above 70% by weight of ceramics, on the other hand, there appear a decrease in the steam reforming activity and electrode activity and an increase in the electric resistance due to reduction in the ruthenium and nickel contents.

Ceramics are composed mainly of cerium oxide and can contain 1 to 20% by weight, preferable 5 to 15% by weight, of at least one of MgO, CaO, SrO, $Y_2O_3$, $La_2O_3$, $Nd_2O_3$, $Sm_2O_3$, $Eu_2O_3$, $Ho_2O_3$, $Er_2O_3$ and $Yb_2O_3$. By addition of these compounds, the steam reforming activity of ruthenium and the electrode activity of nickel can be further improved.

Solid electrolyte of the present solid oxide fuel cell is not particularly limited, and includes, for example, yttria-stabilized zirconia (YSZ) and calcia-stabilized zirconia (CSZ).

Air electrode of the present solid oxide fuel cell is not particularly limited, and includes, for example, complex oxide of perovskite type lanthanum system such as $La_{1-x}SR_xMnO_3$ and $LaCoO_3$.

Unit cells for the present solid oxide fuel cell each comprise a solid electrolyte, and a fuel electrode and an air electrode provided on both sides of the solid electrolyte, have such a shape as a flat plate shape or a cylindrical shape.

Process for making the present solid oxide fuel cell is not particularly limited. For example, in case of a unit cell in a flat plate shape, a green sheet of YSZ is prepared by a doctor blade, followed by defatting and firing, whereby a sintered, flat plate-shaped solid electrolyte having a film thickness of 100 to 300 μm is prepared. Then, a green sheet of $La_{1-x}Sr_xMnO_3$ prepared by a doctor blade is pasted onto one side of the thus prepared sintered electrolyte as a support, followed by firing, or a $La_{1-x}Sr_xMnO_3$ slurry is applied to the one side of the sintered electrolyte, followed by firing, or $La_{1-x}Sr_xMnO_3$ power is melt-injected onto the one side of the sintered electrolyte, thereby forming an air electrode. A green sheet, a slurry or powder of nickel-ceramics is provided on the opposite side to the air electrode-formed side of the sintered electrolyte in the same manner as in the case of forming the air electrode, thereby forming a layer of nickel-ceramics, and then ruthenium is supported on the layer of nickel-ceramics by impregnation or plating, thereby forming a fuel electrode. That is, a flat plate type, unit cell can be made thereby.

Nickel-ceramics as a raw material for the green sheet, slurry or powder of nickel-ceramics can be prepared by mixing and firing or by coprecipitation and firing of oxides, carbonates or nitrates.

According to another process for making a unit cell, a flat porous plate of $La_{1-x}Sr_xMnO_3$ to serve as an electrolyte is prepared, and an electrolyte YSZ is formed on one side of the flat porous plate as a support by melt injection or chemical vapor deposition or electrochemical vapor deposition of YSZ. Then, a layer of nickel-ceramics is formed on the surface of electrolyte YSZ by melt injection or by slurry application and firing, and then ruthenium is supported on the layer of nickel-ceramics by impregnation or plating, thereby forming a fuel electrode. That is, a unit cell is made thereby. That is, a flat plate type, unit cell can be also made thereby.

According to another method, a flat porous plate of nickel-ceramics is prepared, and electrolyte YSZ is formed on one side of the flat porous plate by melt injection or chemical vapor deposition or electrochemical vapor deposition of YSZ. Then, a green sheet of $La_{1-x}Sr_xMnO_3$ prepared by a doctor blade is pasted on the surface of electrolyte YSZ, followed by firing, or a slurry of $La_{1-x}Sr_xMnO_3$ is applied to the surface of electrolyte YSZ, followed by firing or powder of $La_{1-x}Sr_xMnO_3$ is melt injected onto the surface of electrolyte YSZ, thereby forming an air electrode. Then, ruthenium is supported on the flat porous plate of nickel-ceramics by impregnation or plating, thereby forming a fuel electrode. That is, a unit cell can be made thereby.

In case of a cylindrical unit cell, a layer of $La_{1-x}Sr_xMnO_3$ as air electrode is formed on the outer surface of a porous zirconia cylinder as a support by melt injection or slurry application, followed by firing. Then, a layer of electrolyte YSZ is formed on the outer surface of the air electrode by melt injection or by chemical vapor deposition or electrochemical vapor deposition. Then, a layer of nickel-ceramics is formed on the outer surface of the electrolyte YSZ layer by melt injection or slurry application, followed by firing, and then ruthenium is supported on the layer of nickel-ceramics by impregnation or plating, thereby forming a fuel electrode. That is, a unit cell can be made thereby. Or, a porous cylinder of $La_{1-x}Sr_xMnO_3$ to serve as an air electrode is used as a support in place of the porous zirconia cylinder, and an electrolyte layer and a fuel electrode are formed likewise thereon successive, thereby making a unit cell.

In the present invention, hydrocarbon is not particularly limited, and includes, for example, natural gas, LPG, naphtha, kerosene, etc.

PREFERRED EMBODIMENTS OF THE INVENTION

The present invention will be described in detail below, referring to the Example and the Comparative Examples, the and drawing.

EXAMPLE (1) A slurry of the following composition containing yttria-stabilized zirconia powder TZ-8 (trademark of a product made by Toso K.K., Japan) as a raw material was mixed in a ball mill, and a green sheet having a thickness of 600 μm was prepared therefrom by a doctor blade:

| | |
|---|---|
| TZ-8Y | 100 g |
| polyvinylbutyral | 10 g |
| Di-n-butyl phthalate | 8 ml |
| Fish oil | 2 ml |
| Polyethyleneglycol mono-p-octylphenylether | 2 ml |
| Isopropyl alcohol | 40 ml |
| Toluene | 40 ml |

The thus prepared green sheet was cut into a disk, 20 mm in diameter, which was defatted at 350° C. and fired at 1,500° C. for 5 hours, thereby obtaining a sintered electrolyte disk, 16 mm in diameter and 200 μm in thickness.

(2) Lanthanum carbonate, strontium carbonate and manganese carbonate were weighed out in a predetermined composition ratio, wet mixed in ethanol in a ball mill, then the ethanol evaporated off and calcined at 1,000° C. for 10 hours. Then, the calcined product was again wet mixed in ethanol in a ball mill, the ethanol evaporated off and calcined at 1,000° C. for 10 hours, thereby obtaining powder of $La_{0.7}Sr_{0.3}MnO_3$.

A slurry of the following composition containing the thus obtained powder as a raw material was mixed in a ball mill and a green sheet having a thickness of 200 μm was prepared therefrom by a doctor blade:

| | |
|---|---|
| $La_{0.7}Sr_{0.3}MnO_3$ | 100 g |
| Polyvinylbutyral | 10 g |
| Di-n-butyl phthalate | 8 ml |
| Fish oil | 2 ml |
| Polyethyleneglycol mono-p-octylphenylether | 2 ml |
| Isopropyl alcohol | 40 ml |

-continued

| | |
|---|---|
| Toluene | 40 ml |

(3) Basic nickel carbonate, samarium oxide and cerium oxide were weighed out in a predetermined composition ratio, wet mixed in ethanol in a ball mill, the ethanol evaporated off and calcined at 1,400° C. for 5 hours. Then, the calcined product was again wet mixed in ethanol in a ball mill, the ethanol evaporated off and calcined at 1,400° C. for 5 hours, thereby obtaining powder of $NiO:(Sm_2O_3)_{0.11}(CeO_2)_{0.89}=50.6:49.4$ by weight.

A slurry of the following composition containing the thus obtained powder as a raw material was mixed in a ball mill, and a green sheet having a film thickness of 200 μm was prepared therefrom by a doctor blade:

| | |
|---|---|
| $NiO.(Sm_2O_3)_{0.11}(CeO_2)_{0.89}$ | 100 g |
| Polyvinylbutylral | 10 g |
| Di-n-butyl phthalate | 8 ml |
| Fish oil | 2 ml |
| Polyethyleneglycol mono-p-octylphenylether | 2 ml |
| Isopropyl alcohol | 40 ml |
| Toluene | 40 ml |

(4) The green sheet of $NiO.(Sm_2O_3)_{0.11}(CeO_2)_{0.89}$ prepared in (3) was cut into a disk, 8 mm in diameter, pasted onto one side of the sintered electrolyte disk prepared in (1), defatted at 350° C. and fired at 1,450° C. for 5 hours, thereby baking the green sheet disk of (3) onto the sintered electrolyte disk. Then, the green sheet of $La_{0.7}Sr_{0.3}MnO_3$ prepared in (2) was cut into a disk, 8 mm in diameter, pasted onto the opposite side to the $NiO.(Sm_2O_3)_{0.11}(CeO_2)_{0.89}$- baked side of the sintered electrolyte disk, defatted at 350° C. and fired at 1,200° C. for 5 hours, thereby baking the green sheet disk of (2) onto the sintered electrolyte disk to form an air electrode.

(5) The $NiO.(Sm_2O_3)_{0.11}(CeO_2)_{0.89}$ baked on the sintered electrolyte disk was impregnated with a solution of ruthenium chloride in ethanol and dried with air, thereby obtaining a unit cell A with a fuel electrode of $Ru:Ni:(Sm_2O_3)_{0.11}(CeO_2)_{0.89}=5:42.4:52.6$ by weight. Up to this process step, the ruthenium and nickel in the fuel electrode were in the forms of chloride and oxide, respectively, and can be reduced to metals, respectively, by a fuel gas, when evaluated as a cell, thereby forming a cermet (mixture of ceramics and metal) of the above-mentioned composition.

(6) The thus obtained unit cell A was set in an evaluation apparatus shown in FIG. 1, and the evaluation apparatus was with an argon gas, the apparatus was heated at a rate of 10° C./min. and kept at 1,000° C. After it was confirmed that the fuel electrode-provided side of the sintered electrolyte disk 2 was sealed with pyrex glass, an air gas 9 was led to the air electrode 3 at a rate of 100 ml/min., and a mixed gas of hydrogen/$H_2O$ (70:30% by volume) as a fuel gas 10 was led to the fuel electrode 1 at a rate of 100 ml/min., and an overvoltage of the fuel electrode 1 was measured by a DC three-probe procedure and an AC impedance procedure, using the electrodes 1 and 3 and a Pt reference electrode 4. The results are shown in the following Table 1.

TABLE 1

| | | Fuel electrode overvoltage mV (current density 1.0 A/cm²) | |
|---|---|---|---|
| | Fuel electrode composition | Hydrogen | Carbon monoxide |
| Example 1 | $Ru.Ni.(Sm_2O_3)_{0.11}(CeO_2)_{0.89}$ | 47 | 147 |
| Comp. Ex. 1 | $Ni.(Sm_2O_3)_{0.11}(CeO_2)_{0.89}$ | 50 | 312 |
| Comp. Ex. 2 | $Ni.(Y_2O_3)_{0.08}(ZrO_2)_{0.92}$ | 195 | 483 |

(7) An overvoltage of fuel electrode 1 was measured in the same manner as in (6), except that a mixed gas of carbon monoxide/carbon dioxide (70:30% by volume) was used as a fuel gas to the fuel electrode 1. The results are shown in the foregoing Table 1.

(8) The unit cell A was set in an evaluation apparatus shown in FIG. 1, and the evaluation apparatus was maintained in an electric furnace, and, after the furnace was thoroughly flushed with an argon gas, the apparatus was heated at a rate of 10° C./min. and kept at 1,000° C. After it was confirmed that the fuel electrode-provided side of the sintered electrolyte disk was sealed with pyrex glass seal ring 7, an air gas 9 was led to the air electrode 3 at a rate of 100 ml/min., and a mixed gas of methane/$H_2O$ (25:75% by volume) as a fuel gas 10 was led to the fuel electrode 1 at a rate of 100 ml/min., and an output of the unit cell A was measured by a DC three-probe procedure, using the electrodes 1 and 3. The results are shown in the following Table 2.

TABLE 2

| | | Maximum output W/cm² | |
|---|---|---|---|
| | Fuel electrode composition | Methane | Butane |
| Example 1 | $Ru.Ni.(Sm_2O_3)_{0.11}(CeO_2)_{0.89}$ | 0.43 | 0.40 |
| Comp. Ex. 1 | $Ni.(Sm_2O_3)_{0.11}(CeO_2)_{0.89}$ | 0.36 | 0.32 |
| Comp. Ex. 2 | $Ni.(Y_2O_3)_{0.08}(ZrO_2)_{0.92}$ | 0.23 | — |

(9) Output of the unit cell A was measured in the same manner as in (8), except that a mixed gas butane/$H_2O$ (7.7:92.3% by volume) was used as a fuel gas to the fuel electrode. The results are shown in the foregoing Table 2.

The evaluation apparatus used in the foregoing evaluation had such a structure as given below and shown in FIG. 1.

The unit cell comprising the sintered electrolyte disk 2 and the fuel electrode 1, the air electrode 3 and a reference Pt electrode 4, baked onto the sintered electrolyte disk 2 was supported with double alumina tube 11 from the upside and the downside. Current collector Pt meshes 5 were pressed onto the fuel electrode 1 and the air electrode 3 by the inner tube of the double tube 11, respectively. A pyrex glass seal ring 7 was inserted between the outer tube of the double tube 11 and the lower peripheral side of the sintered electrolyte disk 2 and fixed to the lower peripheral side of the disk 2 by the seal ring 7. Pt wires 6 were fixed to the current collector meshes 5 and the reference P electrode 4 for evaluating the electrode characteristics. The thus prepared assembly was inserted into an alumina tube 11, and set into an electric furnace. Then, air 9 was introduced through the inner tube of the upper alumina double tube 11 above the sintered electrolyte disk 2, and a fuel gas 10 was led through the inner tube of the lower double tube 11 below the sintered electrolyte disk 2, while controlling temperature by a thermocouple 8, thereby conducting evaluation under the above-mentioned conditions.

Comparative Example 1

(1) The same sintered electrolyte disk, green sheet of $La_{0.7}Sr_{0.3}MnO_3$ and green sheet of $NiO.(Sm_2O_3)_{0.11}(CeO_2)_{0.89}$ as in Example were prepared according to the procedures (1), (2) and (3) of Example, and the thus prepared green sheets were baked onto the sintered electrolyte disk according to the same procedure as that (4) of Example, thereby making a unit cell B comprising an air electrode of $La_{0.7}Sr_{0.3}MnO_3$ and a fuel electrode of $Ni:(Sm_{O3})_{0.11}(CeO_2)_{0.89}$ (=44.7:55.4 by weight). Up to this process step, the nickel of the fuel electrode was in the form of oxide, but was reduced to metallic nickel by a fuel gas, when evaluated as a cell, thereby forming a cermet of the above-mentioned composition.

(2) The unit cell B was set in the same evaluation apparatus as used in Example and the evaluation apparatus was maintained in an electric furnace, and, after the furnace was thoroughly flushed with an argon gas, the apparatus was heated at a rate of 10° C./min. and kept at 1,000° C. After it was confirmed that the fuel electrode-provided side of the sintered electrolyte disk was sealed with pyrex glass seal ring 7, an air gas was led to the air electrode at a rate of 100 ml/min. and a mixed gas of hydrogen/$H_2O$ (70:30% by volume) as a fuel gas was led to the fuel electrode at a flow rate of 100 ml/min., and an overvoltage of the fuel electrode was measured by a DC three-probe procedure and an AC impedance procedure. The results are shown in the foregoing Table 1.

(3) An overvoltage of the fuel electrode was measured in the same manner as in (2) of Comparative Example 1, except that a mixed gas of carbon monoxide/carbon dioxide (70:30% by volume) was used as a fuel gas to the fuel electrode. The results are shown in the foregoing Table 1.

(4) The unit cell B was set in the same evaluation apparatus as used in Example, and the evaluation apparatus was maintained in an electric furnace, and, after the furnace was thoroughly flushed with an argon gas, the apparatus was heated at a rate of 10° C./min. and kept at 1,000° C. After it was confirmed that the fuel electrode-provide side of the sintered electrolyte disk was sealed with pyrex glass seal ring 7, an air gas was led to the air electrode at a rate of 100 ml/min. and a mixed gas of methane/$H_2O$ (25:75% by volume) as a fuel gas was led to the fuel electrode at a rat of 100 ml/min., and an output of the unit cell B was measured by a DC three-probe procedure. The results are shown in the foregoing Table 2.

(5) Output of the unit cell B was measured in the same manner as in (4) of Comparative Example 1, except that a mixed gas of butane/$H_2O$ (7.7:92.3% by volume) was used as a fuel gas to the fuel electrode. The results are shown in the foregoing Table 2.

Comparative Example 2

(1) The same sintered electrolyte disk and green sheet of $La_{0.7}Sr_{0.3}MnO_3$ were prepared according to the procedures (1) and (2) of Example. Then, basic nickel carbonate and yttria-stabilized zirconia powder TZ-8 (trademark of a product made by TOSO K.K., Japan) were weighed out in a predetermined composition ratio and wet mixed in ethanol in a ball mill, then the ethanol evaporated off and calcined at 1,400° C. for 5 hours. Then, the calcined product was again wet mixed in ethanol in a ball mill, the ethanol evaporated off and calcined at 1,400° C. for 5 hours, thereby obtaining powder of $NiO:(Y_2O_3)_{0.08}(ZrO_2)_{0.92}$ (=56:44% by weight).

A slurry of the following composition containing the thus obtained powder as a raw material was mixed in a ball mill and a green sheet of $NiO.(Y_2O_3)_{0.08}(ZrO_2)_{0.92}$ having a film thickness of 200 m was prepared by a doctor blade:

| | |
|---|---|
| $NiO.(Y_2O_3)_{0.08}(ZrO_2)0.92$ | 100 g |
| Polyvinyl butyral | 10 g |
| Di-n-butyl phthalate | 8 ml |
| Fish oil | 2 ml |
| Polyethyleneglycol mono-p-octylphenol ether | 2 ml |
| Isopropyl alcohol | 40 ml |
| Toluene | 40 ml |

(2) These green sheets were baked onto the sintered electrolyte disk according to the procedure (4) of Example to make a unit cell C comprising an air electrode of $La_{0.7}Sr_{0.3}MnO_3$ and a fuel electrode of $Ni:(Y_2O_3)_{0.08}(ZrO_2)_{0.92}$ (=50:50 by weight). Up to this process step, the nickel of the fuel electrode was in the form of oxide, but was reduced to metallic nickel by a fuel gas when evaluated as a cell, thereby forming a cermet of the above-mentioned composition.

(3) The unit cell C was set in the same evaluation apparatus as used in the Example, and the evaluation apparatus was maintained in an electric furnace, and, after the furnace was thoroughly flushed with an argon gas, the apparatus was heated at a rate of 10° C./min. and kept at 1,000° C. After it was confirmed that the fuel electrode-provided side of the sintered electrolyte disk was sealed with pyrex glass seal ring 7, an air gas was led to the air electrode at a rate of 100 ml/min., and a mixed gas of hydrogen/$H_2O$ (70:30% by volume) as a fuel gas was led to the fuel electrode at a flow rate of 100 ml/min., and an overvoltage of the fuel electrode was measured by a DC three-probe procedure and an AC impedance procedure. The results are shown in the foregoing Table 1.

(4) An overvoltage of the fuel electrode was measured in the same manner as in (3) of Comparative Example 2, except that a mixed gas of carbon monoxide/carbon dioxide (70:30% by volume) was used as a fuel gas to the fuel electrode. The results are shown in the foregoing Table 1.

(5) The unit cell C was set in the same evaluation apparatus as used in Example, and the evaluation apparatus was maintained in an electric furnace, and, after the furnace was thoroughly flushed with an argon gas, the apparatus was heated at a rate of 10° C./min. and kept at 1,000° C. After it was confirmed that the fuel electrode-provided side of the sintered electrolyte disk was sealed with pyrex glass seal ring 7, an air gas was led to the air electrode at a rate of 100 ml/min., and a mixed gas of methane/H$_2$O (25:75% by volume) as a fuel gas was led to the fuel electrode at a rate of 100 ml/min., and an output of the unit cell C was measured by a DC three-probe procedure. The results are shown in the foregoing Table 2.

As shown in the foregoing Tables 1 and 2, a solid oxide fuel cell using the present fuel electrodes having a low overvoltage with both hydrogen and carbon monoxide and a high steam reforming activity can directly steam-reform hydrocarbon on the fuel electrodes and can produce a high output.

The present solid oxide fuel cell can perform power generation of high efficiency with hydrocarbon as a fuel gas by using the present fuel electrodes without any reformer or by partially reforming the hydrocarbon as a raw material through a reformer of much smaller size, or can perform power generation of higher efficiency with hydrogen resulting from complete reforming of hydrocarbon or a steam-reformed gas containing carbon monoxide as the main component as a fuel gas than the conventional solid oxide fuel cell.

What is claimed is:

1. A solid oxide fuel cell, which comprises an assembly of a plurality of unit cells each comprising a solid electrolyte, a fuel electrode contacting one side of the solid electrolyte and an air electrode an opposite side of the solid electrolyte, respectively, the fuel electrode comprising ruthenium, nickel and ceramics containing both CeO$_2$ and at least one oxide selected from the group consisting of Sm$_2$O$_3$, Eu$_2$O$_3$, Ho$_2$O$_3$ and Er$_2$O$_3$.

2. A solid oxide fuel cell according to claim 1, wherein the fuel electrode comprises not more than 30% by weight of the ruthenium, 20 to 56% by weight of the nickel and 10 to 70% by weight of the ceramics.

3. A solid oxide fuel cell according to claim 1, wherein the ceramics comprise 80 to 99% by weight cerium oxide.

4. A solid oxide fuel cell according to claim 3, wherein the ceramics comprise 80–99% by weight cerium oxide.

5. A solid oxide fuel according to claim 2, wherein the ceramics comprise cerium oxide.

6. A solid oxide fuel cell according to claim 5, wherein the ceramics comprise 80–99% by weight cerium oxide.

* * * * *